United States Patent [19]

Vidal

[11] 4,307,204

[45] Dec. 22, 1981

[54] ELASTOMERIC SPONGE

[75] Inventor: Antonio Vidal, Hockessin, Del.

[73] Assignee: E. I. Du Pont de Nemours and Company, Wilmington, Del.

[21] Appl. No.: 61,046

[22] Filed: Jul. 26, 1979

[51] Int. Cl.³ ............................................. C08L 47/00
[52] U.S. Cl. ..................................... 521/140; 521/94; 521/95; 521/98; 521/134; 525/196; 525/211; 525/213; 525/221
[58] Field of Search ............... 525/196, 211, 221, 213; 521/140, 134, 139

[56] References Cited

U.S. PATENT DOCUMENTS

| | | | |
|---|---|---|---|
| 3,437,718 | 4/1969 | Rees | 521/221 |
| 3,810,964 | 5/1974 | Ehrenfreund | 521/134 |
| 3,965,055 | 6/1976 | Shichman et al. | 525/211 |
| 4,102,829 | 7/1978 | Watanabe et al. | 521/134 |
| 4,171,411 | 10/1979 | Ehrenfreund | 521/139 |

Primary Examiner—Morton Foelak

[57] ABSTRACT

An expandable composition of a solid synthetic vulcanizable elastomer of ethylene/higher alpha-olefin/nonconjugated diene copolymer or polychloroprene, a blowing agent, and a curing agent for the elastomer, said composition containing from about 5-25% based on the weight of total polymer of an ionomer resin which is an ethylene polymer containing at least about 50 mole percent ethylene and bearing from about 0.2-25 mole percent acid functional groups that are at least about 50% neutralized by metal ions.

18 Claims, No Drawings

ELASTOMERIC SPONGE

BACKGROUND OF THE INVENTION

This invention is directed to an expandable composition of an ethylene/higher alpha-olefin/nonconjugated diene copolymer or polychloroprene and an ionomer.

Synthetic elastomers have been expanded by the action of blowing agents to manufacture products having a cellular structure. Cellular elastomers having closed cells are especially useful because they are flexible while, at the same time, they have high compressive strengths. Such cellular products are used as automotive and constructive gaskets and pipe insulation. Although synthetic elastomers including ethylene/propylene/nonconjugated diene copolymers (EPDM) and polychloroprene can be expanded to form cellular products, it is a somewhat complicated procedure. For example, ethylene/higher alpha-olefin/nonconjugated diene copolymers have been expanded by a procedure in which the copolymer is partially cured below the decomposition temperature of the blowing agent, and then the copolymer is blown while curing is completed. Polychloroprene can be blown by a similar procedure to form closed cell expanded articles. Usually, therefore, when EPDM or polychloroprene compositions are expanded a careful balancing of compound viscoelasticity, cure rate and blowing rate is required. This necessitates the selection of a particular blowing agent and a particular curing agent so that decomposition of the blowing agent is carefully coordinated with the rate of cure of the elastomer. Accordingly, there is a need for an expandable composition of vulcanizable ethylene/higher alpha-olefin/nonconjugated diene copolymer or polychloroprene that can be easily processed and that can form a closed cell sponge having uniform cell size with little, if any, concern given to careful balancing of the cure rate with the rate of blowing.

SUMMARY OF THE INVENTION

It has now been discovered that certain synthetic vulcanizable amorphous elastomers can be cured and blown simultaneously, with ease, if bubble growth is controlled during the blowing step by the presence of a minor amount of an ionomer. More specifically, the expandable composition of this invention comprises a solid synthetic vulcanizable elastomer selected from the group consisting of ethylene/higher alpha-olefin/nonconjugated diene copolymer and polychloroprene, a blowing agent and a curing agent for the elastomer wherein said composition contains from about 5–25%, preferably 5–15%, based on the weight of total polymer, of an ionomer resin which is an ethylene polymer containing at least about 50 mole percent ethylene and bearing from about 0.2–25 mole percent acid functional groups that are at least about 50% neutralized, preferably about 85–100%, by metal ions. The expandable composition forms an elastomeric closed cellular sponge when it is heated to a temperature sufficient to activate the blowing agent and curing agent. The expandable composition is much less sensitive to curing conditions than prior art compositions, and improved melt rheology permits the composition of this invention to be extruded and cured at higher temperatures than normal, thus requiring shorter curing times which, of course, is more economical. These expanded compositions are particularly useful for automotive and construction gaskets.

DESCRIPTION OF PREFERRED EMBODIMENTS

The vulcanizable synthetic elastomer that is expanded is preferably a solid ethylene/higher alpha-olefin/nonconjugated diene copolymer. The higher alpha-olefin usually has 3–6 carbon atoms and can be propylene, 1-butene, 4-methylene-1-pentene, 1-pentene, 1-hexene, and the like. Preferably, because of its commercial availability and the resulting properties of such elastomers, propylene is the higher alpha-olefin of choice and the elastomer is the well known EPDM rubber. Such rubber generally contains about 15–50 weight percent propylene and about 1–10 weight percent diene. The nonconjugated diene can contain 5–24 carbon atoms in either straight or branched chain or cyclic structure. Representative nonconjugated dienes include aliphatic dienes such as 1,4-hexadiene, 1,9-octadecadiene, 11-ethyl-1,11-tridecadiene, 6-methyl-1,5-heptadiene or cyclic dienes such as dicyclopentadiene, 5-alkenyl substituted norbornenes, e.g., 5(2-butenyl)-2-norbornene, 1,5-cyclooctadiene, 5-alkylidene-2-norbornene, e.g., 5-methylene-2-norbornene and 5-ethylidene-2-norbornene. Particularly preferred EPDM elastomers contain, as the nonconjugated diene, either 1,4-hexadiene or ethylidene norbornene.

Another solid synthetic vulcanizable amorphous elastomer that can be used as a component of the expandable compositions of this invention is polychloroprene rubber (CR), commonly known as neoprene. CR is commercially available in a number of grades or modifications, all of which are suitable for use in the compositions of this invention.

The expandable compositions of this invention contain from about 5–25 weight percent, preferably about 5–15 weight percent, based on the total amount of polymers in the composition, of an ionomer that is formed by at least partial neutralization, i.e., at least 50%, or complete neutralization of a polymer of ethylene containing at least about 50 mole % ethylene units and bearing from about 0.2–25 mole percent, usually about 1–10 mole percent, acid functional groups. By "neutralization" is meant that the acid groups of the polymer have been reacted with a basic metal compound to convert them to ionic salt groups. Suitable basic metal compounds that can be used to neutralize the ethylene polymer to form the ionomer include the hydroxides, oxides, carbonates, bicarbonates, and organic carboxylates such as formates, acetates or acetal acetonates of the metals of Groups I, II and III of the Periodic Table of the Elements. The neutralization of the acid functional groups can be effected either before mixing with the synthetic elastomer or during the mixing step by the addition of a basic metal compound, such as zinc oxide, to the formulation. In most cases sufficient basic metal compound is added to the composition to neutralize substantially all of the acid groups in the acid-bearing polymer, and often an amount in excess of that required for complete neutralization of the acid groups is used.

The polymers of ethylene bearing acid functional groups can be formed in several ways, the best known being the copolymerization of ethylene with copolymerizable alpha-beta unsaturated carboxylic acids, either alone or with additional copolymerizable comonomers. Acid groups may also be attached to preformed ethylenic polymers or copolymers by grafting unsaturated acids in so-called "carboxylation" reactions or by sulfonation with a sulfonating agent such as sulfur trioxide. Such ethylene polymers bearing acid functional groups are well known compounds and are further described below.

Copolymers of ethylene with alpha-beta unsaturated carboxylic acids and their conversion to ionomers by neutralization have been described, for example, in U.S. Pat. No. 3,264,272. The carboxylic acids used in such polymers with ethylene may be mono- or dicarboxylic acids - either as free acids or their anhydrides - and monoesters of dicarboxylic acids. Usually such carboxylic acids contain from 3–8 carbon atoms. Representative carboxylic acid monomers used in the copolymers include acrylic acid, methacrylic acid, itaconic acid, maleic acid, fumaric acid, methyl hydrogen maleate, methyl hydrogen fumarate, and maleic anhydride. Although anhydrides such as maleic anhydride, are not carboxylic acids per se because they have no hydrogen attached to the carboxyl group, polymers containing them are readily converted to ionomers by the action of the basic neutralizing agent. Representative copolymers include ethylene/acrylic acid copolymers, ethylene/methacrylic acid copolymers, ethylene/itaconic acid copolymers, ethylene/methyl hydrogen maleate copolymers and ethylene/maleic acid copolymers. In addition to ethylene and an alpha-beta unsaturated carboxylic acid, the copolymer can contain other copolymerizable monoethylenically unsaturated monomers in amounts up to about 50 mole percent of the copolymer. Such monomers include alkyl acrylates, usually having from 1–6 carbon atoms in the alkyl group, vinyl carboxylates and vinyl esters of organic acids in which the acid usually contains 2–8 carbon atoms, acrylic acid derivatives such as acrylonitrile or methacrylonitrile and alpha-olefins having 3–8 carbon atoms. Representative copolymers of this type include ethylene/methacrylic acid/ethyl acrylate copolymers, ethylene/methyl hydrogen maleate/methyl acrylate copolymers, ethylene/methacrylic acid/vinyl acetate copolymers, ethylene/isobutyl acrylate/methacrylic acid, ethylene/propylene/acrylic acid copolymers, ethylene/methacrylic acid/acrylonitrile copolymers, and ethylene/vinyl chloride/acrylic acid copolymers.

Acid groups may be attached to preformed ethylenic polymers such as polyethylene or copolymers such as ethylene/propylene, optionally containing a nonconjugated diene, by grafting unsaturated organic acids containing at least one double bond and at least one functional acid group onto the ethylene polymer in amounts of usually from about 0.5–9% by weight. Especially suitable acids that can be grafted onto the ethylene polymer include fumaric acid, maleic acid, or maleic anhydride, in so-called "carboxylation" reactions. These carboxylated polymers are well known in the art and can be prepared by heating the polymer with the acid at elevated temperatures in the presence of a free radical generator such as a peroxide. Such carboxylated hydrocarbon polymers are described in, for example, U.S. Pat. Nos. 3,236,917, 3,427,183 and 3,862,265. If the hydrocarbon base polymer contains olefinic unsaturated groups, such as those present in EPDM rubber, it is possible to attach unsaturated acids, particularly maleic acid or anhydride or fumaric acid, to the polymer without the use of a free radical generator as described in U.S. Pat. No. 4,010,223. Acid groups can also be attached to ethylene polymers, such as ethylene/propylene copolymers, having olefinic unsaturation by sulfonation with a sulfonating agent such as sulfur trioxide complexed with a Lewis base so that the polymer usually has a sulfonic acid content of from about 0.2–8 mole percent. Sulfonated ethylene/propylene copolymers are described in U.S. Pat. No. 3,642,728.

As mentioned above, the ethylene polymer bearing acid functional groups is neutralized to the ionomer by using basic metal compounds to convert the acid groups to ionic salt groups and thus form a salt of the copolymer of ethylene. Neutralization can take place before the ethylene polymer is mixed with the elastomer or neutralization to the ionomer can take place during the mixing operation. At least 50% of the acid groups are neutralized and preferably 80–100%. Usually, an excess of basic metal is added to the polymer so that substantially all the acid groups are neutralized with metal ions. Representative basic metal compounds that can be used to neutralize the ethylene polymer to form the ionomer include the hydroxides, oxides, carbonates, bicarbonates, formates, and acetates of the metals of Groups I, II and III of the Periodic Table of the Elements. Representative basic metal compounds include sodium hydroxide, chromium octoate, lithium acetate, or magnesium acetal acetonate, but preferably zinc oxide is used because it also functions as a vulcanizing agent or an accelerator.

The blowing agents used in the compositions of this invention are those which generate a gas at temperatures used to cure the elastomers. The blowing agent can be a solid chemical compound that decomposes to produce the gas or an inert liquid that vaporizes at curing temperatures; preferably, solid chemical compounds are used. Generally, the amount of blowing agent incorporated in the expandable composition is from about 1–15 parts, preferably 3–8 parts, per 100 parts total polymer. Usually, the blowing agents are activated at temperatures of from about 150°–220° C., most frequently about 170°–200° C. Chemical blowing agents that decompose to release an inert gas, such as carbon dioxide or nitrogen, at elevated temperatures are especially suitable. Representative chemical blowing agents include azodicarbonamide, dinitrosopentamethylenetetramine, N,N'-dimethyl-N,N'-dinitrosoterephthalamide, azo-bis-isobutyronitrile, benzenesulfonyl hydrazide, 4,4'-oxybis(benzenesulfonyl hydrazide), p-toluenesulfonyl hydrazide and inorganic compounds such as sodium carbonate or bicarbonate. Liquid blowing agents that release inert gases can also be employed. Representative liquid blowing agents that volatilize at curing temperatures to expand the composition include pentane, hexane, heptane, benzene, toluene, methyl chloride, trichloroethane, 1,2-dichloroethane and similar compounds. Optionally, conventional activators for these blowing agents such as pentaerythritol, ethylene glycol, salicylic acid, stearic acid, urea, and the like can be added to the composition along with the blowing agent.

Any conventional vulcanizing system for the ethylene/higher alpha-olefin/nonconjugated diene rubber or the polychloroprene rubber (CR) can be used to cure the expandable composition. Generally, conventional vulcanizing temperatures of from about 150°–220° C. are used to cure the elastomers. Vulcanizing agents incorporated in the expandable composition to cure ethylene/higher alpha-olefin/nonconjugated diene elastomers are elemental sulfur or a compound that releases sulfur at vulcanization temperatures, or mixtures thereof, which compounds are well known in the industry. Representative vulcanizing agents that release sulfur at vulcanization temperatures include thiuram polysulfides, amine disulfides, and sodium polysulfide. Usually about 0.2-5 parts per 100 parts ethylene/higher alpha-olefin/nonconjugated diene elastomer of sulfur or about 0.6-15 parts per 100 parts ethylene/higher alpha-olefin/nonconjugated diene elastomer of compounds that release sulfur are incorporated in the foamable composition. Although it is less preferred, peroxide curing agents, such as aromatic or aliphatic peroxides, can be used to cure the hydrocarbon elastomer. Representative peroxide curing agents include aromatic diacyl peroxides and aliphatic diacyl peroxides, dibasic acid peroxides, ketone peroxides, alkyl peroxyesters, alkyl hydroperoxides, dibenzoyl peroxide, di-tert.-butyl peroxide, dicumyl peroxide, tert.-butylperbenzoate, tert.-butyl cumyl peroxide, and the like. The polychloroprene can be vulcanized by conventional means employing any of the well known vulcanizing systems used for this purpose. Generally, such vulcanizing systems include a metal oxide, e.g., magnesium or zinc oxide, and an organic accelerator or curing agent which can be an amine, phenol, sulfinamide, thiazole, thiuram, thiourea or sulfur.

The expandable compositions of this invention can also include conventional fillers, dessicants, plasticizers and lubricants that are normally used in compounded elastomeric compositions.

The expandable composition of this invention is best prepared in a two step procedure by mixing, in a first step, about 75-95%, based on the weight of total polymer, of the synthetic elastomer, preferably an EPDM rubber, with about 5-25% based on the weight of total polymer of an ethylene polymer bearing acid functional groups, preferably ethylene and methacrylic acid copolymers, either in the free acid or neutralized form, on a two-roll mill at about 45°-64° C. or in an internal mixer at a temperature of from about 140°-180° C. for 4-8 minutes. If the ethylene polymer is added in the free acid form, an amount of a basic metal compound such as zinc oxide sufficient to neutralize, preferably, substantially all of acid functional groups is added to the mixer. The expandable composition can also contain other conventional ingredients, such as processing aids, e.g., stearic acid or oleic acid, accelerators and fillers such as carbon black or calcium carbonate. In a second mixing step the composition described above is mixed on a mill or in an extruder with from about 1-15 parts per 100 parts total polymer of a blowing agent and sufficient curing agent to vulcanize the synthetic elastomer. The resulting composition is heated to activate both the blowing agent and the curing agent, resulting in simultaneously curing and blowing the composition to form a closed cell sponge. Preferably, the composition is mixed in an internal mixer and extruded. It passes out of the extruder and is passed into a hot fluid, such as an inert liquid or gas, where it expands and cures simultaneously.

The following examples illustrate the invention. All parts and percentages are by weight unless stated otherwise.

EXAMPLE 1

An EPDM rubber, which is a copolymer of ethylene, 32 wt % propylene, and 4 wt % 1,4-hexadiene having a Mooney viscosity (ML$_4$ at 121° C.) of 60, is mixed with various ionomer resins and the following ingredients in an internal mixer (Brabender Plasticorder) at 175° C. for 5 minutes at 65 rpm.

| Ingredient | Parts by Wt. |
| --- | --- |
| EPDM rubber (described above) | 16 |
| Ionomer resin (see table) | 4 |
| Zinc Oxide | 2 |
| Stearic Acid | 0.2 |
| SRF Carbon Black | 16 |
| Calcium Carbonate (Atomite Whiting) | 16 |
| Paraffinic Process Oil (Sunpar 2280) | 14 |

The mixed composition is removed from the mixer and both mixture and mixer are cooled to 90° C. The mixture is then returned to the mixer and combined with the following curing and blowing agents while mixing for 3.5 minutes at 90° C. and 45 rpm.

| Curing and Blowing Ingredients | Parts by Wt. |
| --- | --- |
| Calcium Oxide Dispersion (Desical P) | 1.2 |
| Sulfur | 0.4 |
| Methyl Zimate | 0.3 |
| Ethyl Tellurac | 0.1 |
| Mercaptobenzthiazole | 0.2 |
| Thiocarbanilide | 0.1 |
| Ethylene Thiourea (75% in EPM) | 0.06 |
| Azodicarbonamide - blowing agent | 2.0 |

The composition is removed from the mixer and pressed into 3 mm thick placques in a platen press (5 min at 90° C.). Samples from these placques (50 mm×75 mm) are placed in a circulating air oven for the times and at the temperatures indicated below to effect simultaneous blowing and curing, resulting in a closed cell sponge. The density of the cooled samples is determined using a water displacement pycnometer.

| Ionomers Used | |
| --- | --- |
| Ionomer A | 93.8 mole % ethylene, 3.8 mole % methacrylic acid, 2.6 mole % isobutyl acrylate terpolymer, Zn salt. |
| Ionomer B | 96.5 mole % ethylene, 3.5 mole % methacrylic acid, zinc salt. |
| Ionomer Precursor* C | 88.2 mole % ethylene, 11.4 mole % vinyl acetate, 0.4 mole % methacrylic acid copolymer. |
| Ionomer Precursor* D | 88 mole % ethylene, 11.4 mole % vinyl acetate, 2.0 mole % methacrylic acid. |

*100% neutralized during mixing by excess ZnO.

| | Results | | |
| --- | --- | --- | --- |
| | Sponge density (kg/m$^3$) after | | |
| Ionomers Used | 7 min/195° C. | 10 min/195° C. | 5 min/210° C. |
| None* | 350 | 350 | 290 |
| A | 260 | 260 | 240 |
| B | 220 | 240 | 210 |
| C | 230 | 210 | 200 |
| D | 190 | 210 | 210 |

*Amount of EPDM increased to 20 parts to compensate for absence of ionomer resin.

All of the resulting expanded compositions, i.e., closed cell sponges containing ionomer resin, have relatively small cells (average 100 μm or less) of nearly uniform size.

EXAMPLE 2

The procedure described in Example 1 to form closed cell sponge is repeated, except that the EPDM rubber used is a copolymer of ethylene, 40 wt % propylene and 4.7 wt % 1,4-hexadiene having a Mooney viscosity ($ML_4$ at 121° C.) of 70, and the ionomer resins used are:

Ionomer E—Polyethylene grafted with fumaric acid, zinc salt.

Ionomer F—69.4 mole % ethylene, 29.2 mole % methyl acrylate, 1.4 mole % methyl hydrogen maleate copolymer, chromium salt.

| | Results | | |
|---|---|---|---|
| | Sponge density (kg/m$^3$) after | | |
| Ionomer Used | 7 min/195° C. | 10 min/195° C. | 5 min/210° C. |
| None* | 340 | 360 | 290 |
| E | 320 | 310 | 260 |
| F | 250 | 270 | 230 |
| B | 250 | 250 | 230 |

*See footnote of Example 1

EXAMPLE 3

The procedure described in Example 1 to form closed cell sponge is repeated, except that the EPDM rubber used is a copolymer of ethylene, 29 wt % propylene and 3.1 wt % 5-ethylidene-2-norbornene, and the following ionomer precursor is used.

Ionomer Precursor* G—77.1 mole % ethylene, 20.6 mole % propylene, 1.6 mole % 1,4-hexadiene, 0.06 mole % norbornadiene copolymer grafted with 0.6 mole % fumaric acid.

*100% neutralized during mixing with excess ZnO.

| | Results | | |
|---|---|---|---|
| | Sponge density (kg/m$^3$) after | | |
| Ionomers Used | 7 min/195° C. | 10 min/195° C. | 5 min/210° C. |
| None* | 1170 | 680 | 1270 |
| G | 870 | 650 | 650 |
| A | 310 | 270 | 830 |
| C | 1020 | 560 | 1050 |

*See footnote of Example 1.

EXAMPLE 4

The procedure described in Example 2 to make closed cell sponge is repeated, except that the ionomer resins used are:

Ionomer H—Sulfonated ethylene, 59.2 mole % ethylene, 39.7 mole % propylene, 1.2 mole % 2-ethylidene-5-norbornene copolymer, zinc salt.

Ionomer I—Sulfonated EPDM, Zn salt, containing plasticizer.

| | Results | | |
|---|---|---|---|
| | Sponge density (kg/m$^3$) after | | |
| Ionomers Used | 7 min/195° C. | 10 min/195° C. | 7 min/210° C. |
| None* | 400 | 390 | 350 |
| H | 300 | 310 | 270 |
| I | 300 | 310 | 270 |

*See footnote of Example 1.

EXAMPLE 5

A polychloroprene rubber (Neoprene W) is mixed with various ionomer resins given below and the following ingredients on a two-roll mill at 45°-95° C.

| Ingredients | Parts by Wt. |
|---|---|
| Polychloroprene rubber | 40 |
| Ionomer resin (see table) | 10 |
| Carbon black, MT | 17 |
| Carbon black, FEF | 7.5 |
| Aromatic Process Oil (Sundex 790) | 10 |
| Magnesium Oxide | 2 |
| Zinc Oxide | 2.5 |
| Stearic Acid | 0.5 |

When the above ingredients are thoroughly mixed, the following curing agents are added:

Octamine—1
Heliozone—1.5
Sodium Carbonate blowing agent—2.5
Surface Coated Urea (Activator DN, Du Pont)—0.8
Diethylene Thiourea—1.0
Ethylene Thiourea (75% in EPM)—1.4

The mixtures are pressed into sheets, cured and blown as described in Example 1 to form closed cell sponge.

| | Results | | |
|---|---|---|---|
| | Sponge density (kg/m$^3$) after | | |
| Ionomers Used | 7 min/195° C. | 10 min/195° C. | 8 min/205° C. |
| None* | 620 | 620 | 590 |
| A | 510 | 500 | 460 |
| F | 280 | 290 | 240 |
| C | 380 | 370 | 340 |

*Polychloroprene increased to 50 parts

EXAMPLE 6

The following masterbatch is mixed in a Banbury internal mixer for 2 min at 177°-190° C., removed and cooled.

| | Parts by Wt. |
|---|---|
| EPDM of Example 2 | 72.4 |
| EPDM of Example 1 | 17.6 |
| Ethylene/10% methacrylic acid copolymer | 10 |
| Zinc Oxide | 3 |
| Stearic Acid | 0.2 |
| Carbon Black (N 650) | 6.8 |

When it is desired to make extruded sponge, the masterbatch is mixed with curing ingredients as follows in a Banbury mixer until the stock temperature reaches 90° C.

| | Parts by Wt. |
|---|---|
| Above masterbatch | 110 |
| Stearic acid | 0.6 |
| Carbon black (N 650) | 40 |
| Carbon black (N 762) | 110 |
| Paraffinic Process Oil (Sunpar 2280) | 95 |
| Ethyl Tellurac | 0.5 |
| Butyl Zimate | 2 |
| Mercaptobenzthiazole (MBT) | 1 |
| Calcium Oxide Dispersion in oil (Desical P) | 3 |
| Sulfur | 2 |
| Thiocarbanilide (Accelerator A-1) | 0.5 |
| Azodicarbamide (blowing agent) | 6 |

| | Parts by Wt. |
|---|---|
| Pentaaerythritol | 2 |

The mixture is removed from the mixer, formed into strips on a two-roll mill, fed to an extruder and extruded through a die of the desired shape. The extrudate is passed through an air oven maintained at 218° C. where it stays three minutes to effect blowing and curing. The product closed cell sponge has a density of 300 kg/m$^3$ and a small uniform cell structure and is useful as a gasket for automobile doors.

I claim:

1. An expandable composition comprising a solid synthetic vulcanizable elastomer selected from the group consisting of ethylene/higher α-olefin/nonconjugated diene copolymer or polychloroprene, 1–15 parts per 100 parts total polymer of a solid blowing agent, a curing agent for the elastomer, and from about 5–25 percent based on the weight of total polymer of an ionomer resin which is an ethylene polymer containing at least about 50 mol percent ethylene and bearing from about 0.2–25 mol percent acid functional groups that are at least about 50% neutralized by metal ions, said composition when heated to activate the blowing agent and the curing agent undergoing simultaneous curing and expansion to form a closed cell sponge of substantially uniform cell size.

2. An expandable composition of claim 1 containing 5–15% based on the weight of total polymer of the ionomer resin.

3. An expandable composition of claim 1 wherein the ionomer is a salt of a copolymer of ethylene and an α-β unsaturated carboxylic acid containing 3–8 carbon atoms.

4. An expandable composition of claim 3 wherein the ionomer is a salt of a copolymer of ethylene and methacrylic acid.

5. An expandable composition of claim 3 wherein the copolymer contains a copolymerizable monoethylenically unsaturated monomer.

6. An expandable composition of claim 5 wherein the copolymerizable monomer is an alkyl acrylate.

7. An expandable composition of claim 5 wherein the ionomer is a salt of a copolymer of ethylene, methacrylic acid and isobutyl acrylate.

8. An expandable composition of claim 5 wherein the ionomer is a salt of ethylene, vinyl acetate and methacrylic acid.

9. An expandable composition of claim 5 wherein the ionomer is a salt of a copolymer of ethylene, an alkyl acrylate and methyl hydrogen maleate.

10. An expandable composition of claim 9 wherein the alkyl acrylate is methyl acrylate.

11. An expandable composition of claim 1 wherein the ionomer is a salt of carboxylated polyethylene.

12. An expandable composition of claim 11 wherein the polyethylene is carboxylated with fumaric acid.

13. An expandable composition of claim 1 wherein the ionomer is a salt of a copolymer of an ethylene, propylene and nonconjugated diene which has been carboxylated with fumaric acid.

14. An expandable composition of claim 1 wherein the ionomer is a salt of a sulfonated ethylene/propylene polymer.

15. An expandable composition of claim 1 wherein the synthetic vulcanizable elastomer is a copolymer of ethylene, propylene and a nonconjugated diene.

16. An expandable composition of claim 15 wherein the nonconjugated diene is 1,4-hexadiene or ethylidene norbornene.

17. An expandable composition of claim 1 wherein the synthetic vulcanizable elastomer is polychloroprene.

18. An expandable composition of claim 1 containing from about 1–15 parts per 100 parts total polymer of blowing agent.

* * * * *